(12) United States Patent
Kim

(10) Patent No.: US 8,189,007 B2
(45) Date of Patent: May 29, 2012

(54) GRAPHICS ENGINE AND METHOD OF DISTRIBUTING PIXEL DATA

(75) Inventor: Chun-Ho Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 878 days.

(21) Appl. No.: 11/964,961

(22) Filed: Dec. 27, 2007

(65) Prior Publication Data

US 2008/0170082 A1 Jul. 17, 2008

(30) Foreign Application Priority Data

Jan. 17, 2007 (KR) .................. 10-2007-0005263

(51) Int. Cl.
*G09G 5/00* (2006.01)

(52) U.S. Cl. ........ 345/581; 345/426; 345/502; 345/505; 345/506; 345/559; 345/582

(58) Field of Classification Search .................. 345/426; 708/490
See application file for complete search history.

(56) References Cited

U.S. PATENT DOCUMENTS

| | | | |
|---|---|---|---|
| 5,841,444 A | 11/1998 | Mun et al. | |
| 6,724,394 B1 | 4/2004 | Zatz et al. | |
| 6,762,763 B1 | 7/2004 | Migdal et al. | |
| 6,825,843 B2 | 11/2004 | Allen et al. | |
| 7,466,318 B1 * | 12/2008 | Kilgard | 345/582 |
| 7,609,272 B1 * | 10/2009 | Kilgariff et al. | 345/522 |
| 7,623,132 B1 * | 11/2009 | Bastos et al. | 345/506 |
| 7,821,520 B1 * | 10/2010 | Bastos et al. | 345/559 |
| 7,830,392 B1 * | 11/2010 | Danskin et al. | 345/544 |
| 2005/0168634 A1 * | 8/2005 | Wyman et al. | 348/448 |
| 2005/0225554 A1 * | 10/2005 | Bastos et al. | 345/506 |
| 2006/0004536 A1 * | 1/2006 | Diamond et al. | 702/123 |
| 2006/0053189 A1 * | 3/2006 | Mantor | 708/490 |
| 2006/0055695 A1 * | 3/2006 | Abdalla et al. | 345/426 |
| 2006/0176316 A1 * | 8/2006 | Nagasaki et al. | 345/621 |
| 2006/0250409 A1 * | 11/2006 | Bando et al. | 345/582 |
| 2007/0159488 A1 * | 7/2007 | Danskin et al. | 345/505 |

FOREIGN PATENT DOCUMENTS

| | | |
|---|---|---|
| JP | 2004126676 | 4/2004 |
| WO | 2005010744 A1 | 2/2005 |
| WO | 2005101322 A1 | 10/2005 |

* cited by examiner

*Primary Examiner* — Xiao M. Wu
*Assistant Examiner* — Phi Hoang
(74) *Attorney, Agent, or Firm* — Volentine & Whitt, PLLC

(57) ABSTRACT

A graphics engine and related method of operation are disclosed in which a pixel distributor distributes pixel data across a plurality of pixel shaders using a first approach when the presence of one or more rendering features is indicated, else using a second approach different from the first approach.

15 Claims, 5 Drawing Sheets

Fig. 3

```
       00  01  10  11 (X-axis)
    ┌────┬────┬────┬────┐
 00 │  0 │  1 │  2 │  3 │
    ├────┼────┼────┼────┤
 01 │  4 │  5 │  6 │  7 │
    ├────┼────┼────┼────┤
 10 │  8 │  9 │ 10 │ 11 │
    ├────┼────┼────┼────┤
 11 │ 12 │ 13 │ 14 │ 15 │
    └────┴────┴────┴────┘
```
(Y-axis) 16 Pixel Rasterized

Fig. 4

```
     00  01  10  11 (X-axis)
   ┌────────┬────────┐
00 │        │        │
   │···A····│····B···│
01 │        │        │
   ├────────┼────────┤
10 │        │        │
   │···C····│····D···│
11 │        │        │
   └────────┴────────┘
```
(Y-axis) Texture Cache Block

Fig. 5

|  | Conventional | | Proposed | |
|---|---|---|---|---|
|  | Pixel Assign | Cache Miss | Pixel Assign | Cache Miss |
| Pixel Shader 1 | 0,2,8,10 | A,B,C,D | 0,1,4,5 | A |
| Pixel Shader 2 | 1,3,9,11 | A,B,C,D | 2,3,6,7 | B |
| Pixel Shader 3 | 4,6,12,14 | A,B,C,D | 8,9,12,13 | C |
| Pixel Shader 4 | 5,7,13,15 | A,B,C,D | 10,11,14,15 | D |

GRAPHICS ENGINE AND METHOD OF DISTRIBUTING PIXEL DATA

CROSS-REFERENCE TO RELATED APPLICATIONS

This application claims priority under 35 U.S.C. §119 to Korean Patent Application No. 10-2007-0005263 filed on Jan. 17, 2007, the subject matter of which is hereby incorporated by reference.

BACKGROUND OF THE INVENTION

1. Field of the Invention

The present invention relates generally to 3-dimensional graphics accelerator. More particularly, the invention relates to a 3-dimensional graphics accelerator that effectively distributes pixel data to a plurality of pixel shaders from a rasterizer.

2. Description of the Related Art

The rapid development of computer hardware and software components enables real-time rendering of 3-dimensional (3D) appearing images (or 3D graphics) in an increasing variety of applications. A number of different data processing techniques have been employed in the rendering of ever more lifelike #D images. Various texture mapping techniques are an excellent example. Texture mapping techniques allow the rendering of more detailed 3D graphics without significantly increasing the number of geometric operations underlying the rendering process. Generally speaking, texture mapping is a technique that replaces pixel data generated by a graphics engine with textured data (e.g., a number of polygons). This replacement produces images having more fine and realistic looking detail.

The term "texture" in this context generally relates to an illustrated 3D object's surface look. Without one or more textures, a 3D object could only be illustrated as naked polygon frame. Textures provide visual detail and impression of reality to the object. A brick wall, a reptile skin, or a reflective metal surface may all be effectively rendered using texture mapping techniques. In general application, many 3D rendering applications include a function that allows the definition and storage of one or more textures later applied to structural frame of an object (e.g., a polygon).

The term "polygon" in this context referred to a 2-dimensional (2D) pattern (e.g., a triangle or rectangle) forming at least a portion of a 3D object. Several hundreds or thousands of polygons are usually necessary to construct the frame of a 3D object.

Texture mapping techniques generally proceed by mapping screen space associated with an object into a texture space, and then filtering the screen space to determine the colors of pixels within the mapped screen space. A pixel within texture space, (sometimes referred to as a texture element of "texel") may not always correspond one-for-one with an image pixel. Consider two examples in this regard. In the first example, several texels correspond to a single image pixel. This relationship is referred to as a scale-down. In the second example, one texel corresponds to more than one image pixels. This relationship is referred to as a magnification. In both of these examples, filtering of the screen space is carried out in order to reduce aliasing effects that may otherwise occur. Thus, filtering is a general technique used to enhance the quality of the texture applied to an object. In effect, filtering improves the mapping source from screen space to texture space. Filtering in several different implementations is used, for example, in MIP mapping techniques.

For the foregoing, it can be understood that the term texel refers to one or more image pixels within a bitmap graphic image associated with one or more textures applied to a polygonal frame of some size and shape.

In practical application, many texturing engines (i.e., a collection of related software routines and related hardware resources) are conventionally available to contemporary users. Many different textures within various formats and sizes are provided by conventional texturing engines.

Of further note, the rendering of 3D graphics is generally accomplished by rendering an object using one or more polygons and then performing a rasterization process by a scan order for each polygon. Most contemporary 3D graphics applications and accelerators utilize a pipelined approach to data processing. Data pipelining, or more particularly "graphics pipelining" is a well understood technique, whereby a stream of operations is organized in the pipeline to improve execution efficiency.

In one related data processing approach, a texture cache is used as an intermediate data storage location between the texturing engine and an external memory storing data associated with the current graphics rendering application. As is well understood with regard to data caches and their use in data processing platforms, data access speed may be greatly enhanced by increasing the access "hit rate" to data stored in the intermediate texture cache. Not surprisingly, the hit rate to the texture cache is regarded as an important factor in determining the overall performance characteristics of a 3D graphics accelerator.

In a conventional 3D graphics accelerator, pixel data generated by a rasterizer is distributed across a plurality of pixel shaders in a defined mode making reference to the image X/Y coordinates of the corresponding pixels. In other words, pixel data generated by the rasterizer is distributed across multiple pixel shaders using the coordinate values of the corresponding pixels. Conventional pixel distribution from the rasterizer proceeds accordingly without other recourse and has become an increasing impediment to emerging 3D graphics accelerator designs, as greater complexity in the generated graphics tends to drive down the hit rate to the texture cache and extending rendering time.

SUMMARY OF THE INVENTION

In one embodiment, the invention provides a 3-dimensional (3D) graphics engine comprising; a plurality of pixel shaders, and a pixel distributor distributing pixel data across the plurality of pixel shaders using a first approach when the presence of one or more rendering features is indicated, else using a second approach different from the first approach.

In another embodiment, the invention provides a graphics engine comprising; a special function register (SFR) generating a control signal, a geometry processing unit generating polygon information in response to the control signal, a rasterizer receiving the polygon information and generating corresponding pixel data, and a pixel distributor receiving and distributing the pixel data across a plurality of pixel shaders in response to the control signal, wherein the control signal indicates the use of one or more rendering features associated with the pixel data.

BRIEF DESCRIPTION OF THE FIGURES

FIG. 3 shows 16 pixels generated by the rasterizer shown in FIG. 2;

FIG. 4 shows the texture cache block shown in FIG. 2;

FIG. 5 comparatively shows pixel distribution results to the pixel shaders in the conventional and present cases.

DESCRIPTION OF EMBODIMENTS

Embodiments of the invention will be described below in some additional detail with reference to the accompanying drawings. The invention may, however, be embodied in different forms and should not be constructed as being limited to only the embodiments set forth herein. Rather, the illustrated embodiments are provided as teaching examples.

Figure 1:
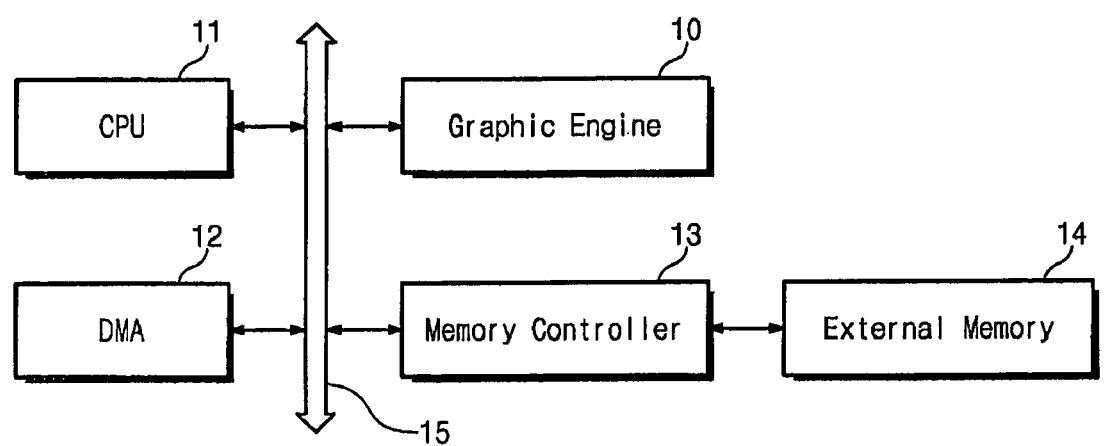
FIG. 1 is a block diagram showing a schematic organization of a 3-dimensional graphic system.
Figure 2:
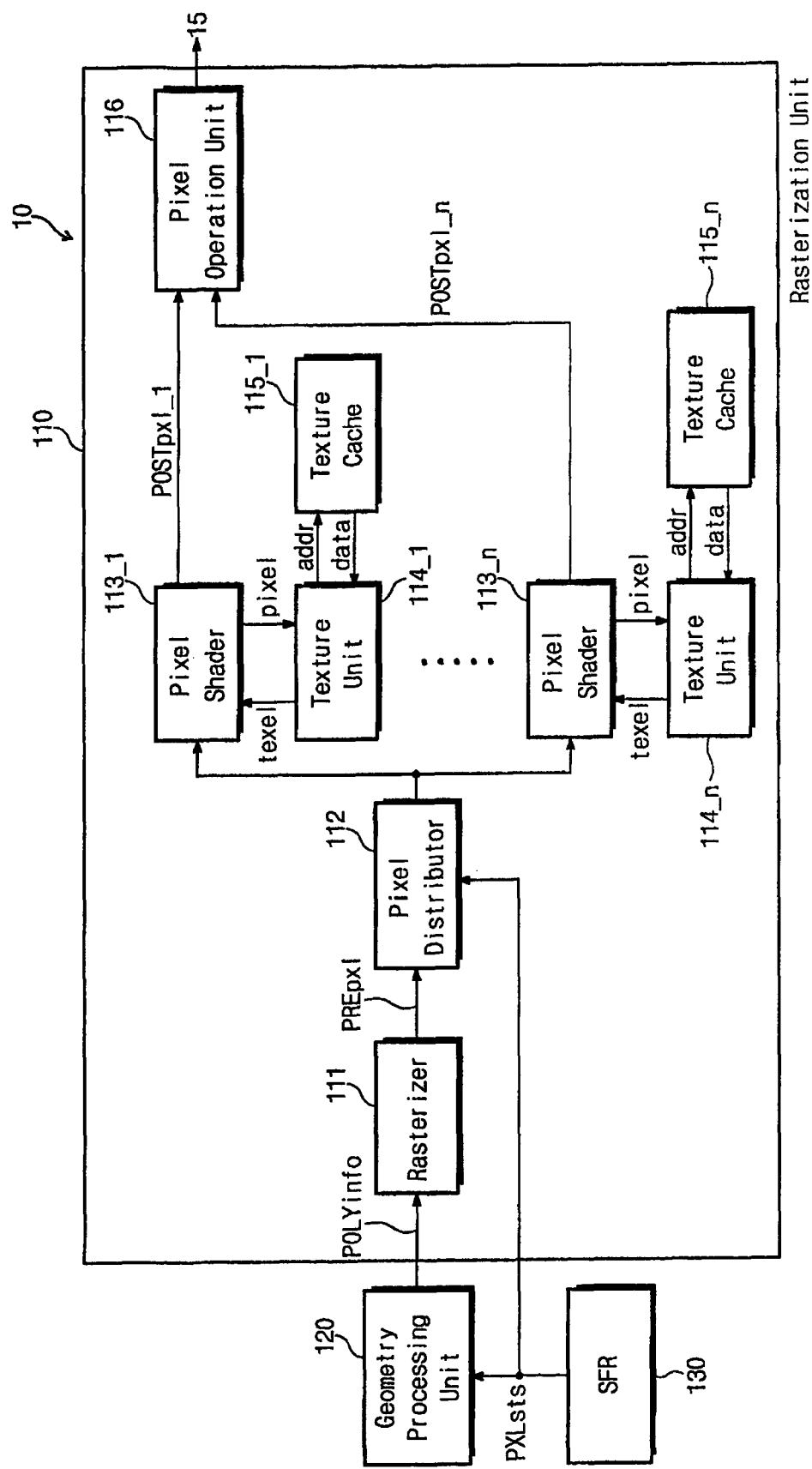
FIG. 2 is a block diagram illustrating a 3-dimensional graphics accelerator in accordance with the present invention.

FIG. 1 is a general block diagram of a 3D graphics system. FIG. 2 is a block diagram further illustrating the 3D graphics accelerator, hereafter "graphics engine", of FIG. 1 according to one embodiment of the invention.

Referring collectively to FIGS. 1 and 2, a graphics engine 10 is connected to a system bus 15 to a central processing unit (CPU) 11, a direct memory access (DMA) unit 12, and a memory controller 13. System bus 15 may be implemented as a collection of master buses and subordinated slave buses. For example, access to an external memory 14 by graphics engine 10 may proceed through memory controller 13 via system bus 15 and a slave bus connecting memory controller 13 and external memory 14. The relationship (or hierarchy) between the components connected to system bus 15 is a matter of design choice, as is the generation and use of address and control signals.

CPU 11 controls overall operation in the 3D graphics system. DMA unit 12 functions at least in part to allow data import/export from/to various peripheral devices associated with the 3D graphics system without requiring computational cycles by CPU 11. This functionality enhances overall system speed. Graphics engine 10 performs all or most of the graphics data processing required to illustrate a 3D image on a peripheral device associated with the 3D graphics system. This image will include one or more objects having a visually apparent height, width, and length in relation to three defined axes.

In relevant portion, graphics engine 10 comprises of a geometry processing unit 120, a rasterization unit 110, and a special function register (SFR) 130. As is well understood by those skilled in the art, the terms "unit", "block" "register", etc. may be variously implemented in hardware and/or software. The block level diagrams provided herewith should not be construed as establishing mandatory hardware circuit delineations of software routine partitions. Rather, the functionality described herein may be variously implemented according to design needs.

SFR 130 is provided to perform certain specific function within the graphics engine 10. For example, a programmer or graphics system user is able to set certain data values into SFR 130 by way of one or more interfaces. In the working example, the current use of certain operational modes (or "rendering features") may be indicated by data values set within SFR 130. These rendering features commonly relate to various image transformation techniques and include, as examples, texture mapping, depth testing, and pixel blending. Texture mapping has been discussed above. Depth testing is a technique for rendering an object such that portions of the object visually blocked by another object are not illustrated in the final image. Pixel blending is a technique for rendering a semi-transparent object.

Within this general architecture, geometry processing unit 120 carries out geometric transformations for projecting an image depicted by 3D coordinate system onto a 2D coordinate plane of a display. Rasterization unit 110 determines the last pixel values to be output to the display for polygons that have been treated by geometry processing unit 120. Rasterization unit 110 conducts various kinds of filtering operations in order to provide a realistic 3D image. For example, rasterization unit 110 may comprise of a rasterizer 111, a pixel distributor 112, pluralities of pixel shaders 113_1~113_$n$, a corresponding plurality of texture processing units 114_1~114_$n$, and a corresponding plurality of texture caches 115_1~115_$n$, and a pixel operation unit 116.

Rasterizer 111 accepts polygon information (POLYinfo) from geometry processing unit 120 and generates pixel data (PREpxl) corresponding to the polygon information.

Pixel distributor 112 operates to distribute the pixel data received from rasterizer 111 across the plurality of pixel shaders 113_1~113_$n$. A conventional pixel distributor may be used to distribute the pixel data across the plurality of pixel shaders 113_1~113_$n$ in accordance with coordinate values (X and Y) for the corresponding pixels. However, pixel distributor 112 according to an embodiment of the invention must also be capable of distributing received pixel data across the plurality of pixel shaders 113~1~113_$n$ in view of one or more rendering features associated with the current image rendering (e.g., texture mapping, depth testing, or pixel blending, etc.).

Each one of the plurality of pixel shaders 113_1~113_$n$ is associated with a corresponding one of the plurality of texture units 114_1~114_$n$ and one of the plurality of texture caches 115_1~115_$n$.

Each one of the plurality of texture units 114_1~114_$n$ conducts a texture filtering operation with reference to the polygon information provided from geometry processing unit 120. Texture data of various kinds to be used for the texture filtering operation may be stored in external memory 14. The texture data stored is at least partially copied from external memory 14 and stored in one of the plurality of texture caches 115_1~115_$n$. The polygon information contains texture format, texture size, polygon size, information about polygon rotation, texture filtering type, and so on.

Pixel operation unit 116 conducts depth testing or pixel blending operation using processed pixel data (POSTpxl) provided by the plurality of pixel shaders 113_1~113_$n$.

FIG. 3 shows an example of 16 pixels generated by rasterizer 111 shown in FIG. 2. FIG. 4 shows an exemplary texture cache block related to the example of FIG. 2. FIG. 5 comparatively shows pixel data distribution results from the plurality of pixel shaders 113_1~113_$n$ for a conventional case and a case drawn to an embodiment of the invention.

Referring to FIGS. 1 through 5, FIG. 3 shows 16 rasterized pixels. The pixels are made by way of a texture mapping operation.

Pixel data associated with pixels, 0,1, 4, and 5, are set by referring to the contents A of the texture cache shown in FIG. 4. Pixel data associated with pixels, 2, 3, 6, and 7, are set by referring to the contents B of the texture cache shown in FIG. 4. Pixel data associated with pixels, 8, 9, 12, and 13, are set by referring to the contents C of the texture cache shown in FIG. 4, and pixel data associated with pixels, 10, 11, 14, and 15, are set by referring to the contents D of the texture cache shown in FIG. 4.

Pixel distributor 112 receives the pixel data from rasterizer 111 and distributes it across the plurality of pixel shaders 113_1~113_$n$.

It is now assumed that only pixel coordinate values are used for distributing the data associated with pixels 0~15 to the four pixel shaders 113_1~113_4. Pixel distributor 112 operates to distribute the pixels 0~15 to the pixel shaders 113_1~113_4 with reference to the respective least significant bits (LSBs) of the corresponding X and Y coordinate axes.

Pixel data associated with pixels 0, 2, 8, and 10 is distributed to first pixel shader 113_1, pixel data associated with pixels 1, 3, 9, and 11 is distributed to second pixel shader 113_2, pixel data associated with pixels 4, 6, 12, and 14 is distributed to third pixel shader 113_3, and pixel data associated with pixels 5, 7, 13, and 15 is distributed to fourth pixel shader 113_4.

As the pixel 0 data is generated by referring to the contents A of first texture cache 115_1, first texture cache 115_1 copies the contents A from external memory 14 if there is not a texture cache hit.

Pixel 2 data is generated by referring to the contents B of first texture cache 115_1. But, a texture cache miss occurs because first texture cache 115_1 does not contain the contents B. Thus, first texture cache 115_1 copies the contents B from external memory 14.

Pixel 8 data refers to the contents C of first texture cache 115_1. But, a cache miss occurs therein because first texture cache 115_1 does not contain the contents C. Thus, first texture cache 115_1 copies the contents C from external memory 14.

Pixel 10 data refers to the contents D of first texture cache 115_1. But, a cache miss occurs therein because first texture cache 115_1 does not contain the contents D. Thus, first texture cache 115_1 copies the contents D from external memory 14.

The other pixel data groups, <1, 3, 9, 11>, <4, 6, 12, 14>, and <5, 7, 13, 15>, are similarly conditioned.

Therefore, according to an exemplary conventional approach, pixel distributor 112 can be operated with up to sixteen independent cache misses.

It is now assumed that pixel distributor 112 is operated according to an embodiment of the invention. Accordingly, pixel distributor 112 distributes the pixel 0~15 data across the plurality of pixel shaders 113_1~113_4 by determining to use the coordinate values associated with the pixels as well as defined rendering features related commonly related to texture mapping. Thus, pixel distributor 112 operates to distribute pixel 0~15 data across the plurality of pixel shaders 113_1~113_4 by referring to the most significant bits (MSBs) of the corresponding X and Y coordinate axes.

As a result, pixel data associated with pixels 0, 1, 4, and 5 is distributed to first pixel shader 113_1; pixel data for pixels 2, 3, 6, and 7 to second pixel shader 113_2; pixel data for pixels 8, 9, 12, and 13 to third pixel shader 113_3, and pixels data for pixels 10, 11, 14, and 15 to fourth pixel shader 113_4.

As pixel data associated with pixel 0 is generated by referring to the contents A of first texture cache 115_1, first texture cache 115_1 copies the contents A from external memory 14, if there is a cache miss.

Pixel data associated with pixel 1 refers to the contents A of first texture cache 115_1. A cache hit occurs therein because the first texture cache 115_1 contains the contents A.

Pixel data associated with pixel 4 also refers to the contents A of first texture cache 115_1. A cache hit occurs therein because first texture cache 115_1 contains the contents A.

Pixel data associated with pixel 5 also refers to the contents A of first texture cache 115_1. A cache hit occurs therein because first texture cache 115_1 contains the contents A.

The other pixel data groups, <2, 3, 6, 7>, <8, 9, 12, 13>, and <10, 11, 14, 15>, are similarly conditioned.

Therefore, pixel distributor 112 according to an embodiment of the invention may be operating with up to only 4 cache misses in the illustrated example.

By distributing the pixels generated by rasterizer 111 across the plurality of pixel shaders considering not only the corresponding pixel coordinate values, but also allowing for the potential use of certain rendering features like texture mapping, depth testing, and pixel blending, the texture cache hit rate may be dramatically improved and overall rendering time reduced. As a result, the performance of the constituent graphics engine is improved.

Figure 6:
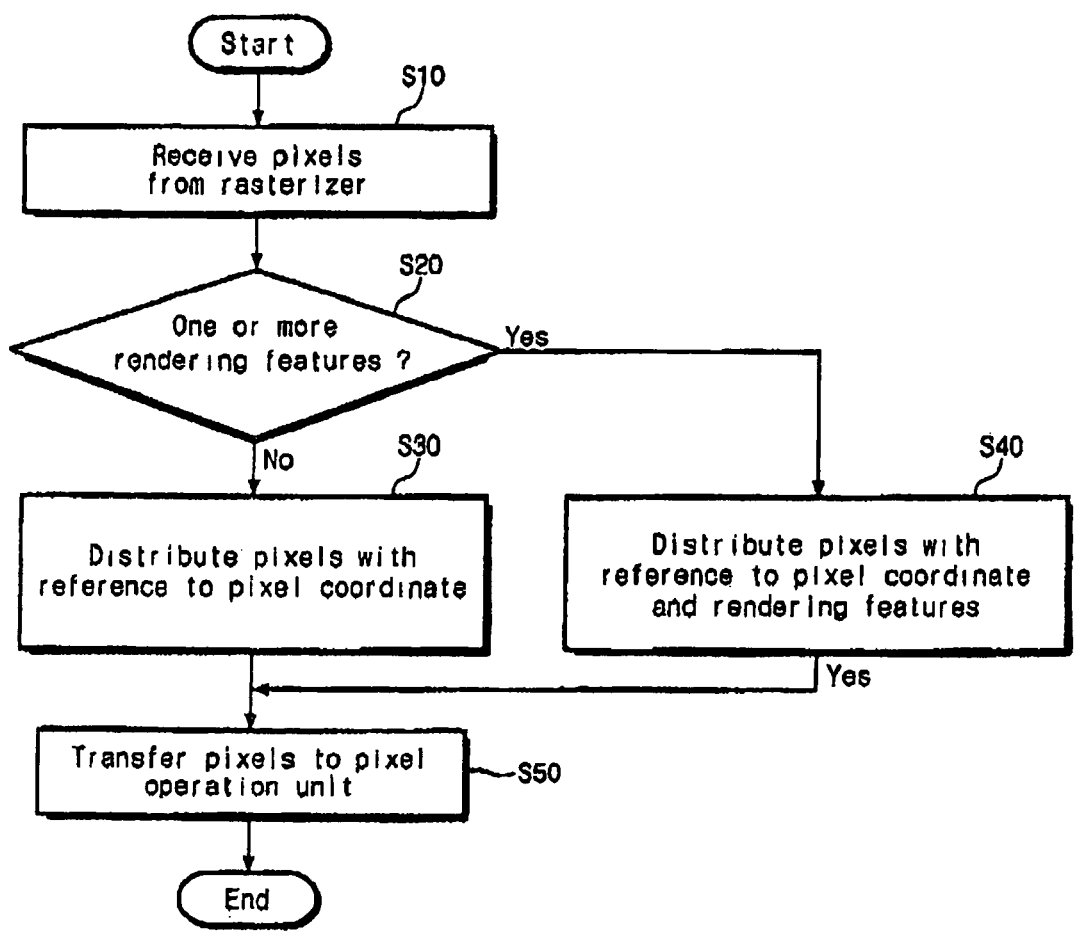
FIG. 6 is a flow chart showing an operation of the 3-dimensional graphics accelerator.

FIG. 6 is a flow chart summarizing an exemplary operation of a graphics engine according to an embodiment of the invention.

Referring to FIGS. 2 through 6, pixel distributor 112 accepts pixel data from rasterizer 111 (S10).

A determination is then made as to whether one or more rendering features is applicable to the pixel data provided by rasterizer 111 (S20). In one embodiment, this determination may be made by interrogating a control signal PXLsts provided to pixel distributor 112 from SFR 112. In accordance with an indication that one or more rendering features is (are) present, pixels data distribution by pixel distributor 112 across a plurality of pixel shaders will be differently performed according to a first or a second approach (e.g., S30 verse S40).

For example, if no rendering features are indicated (S20=no), pixel distributor 112 performs pixel data distribution in consideration of only the coordinate values of the corresponding pixels. In the alternative, if one or more rendering features is indicated, pixel data is distributed by pixel distributor 112 in view of the coordinate values for the corresponding pixels, and further in view of the rendering features indicated.

Following pixel data distribution, pixel operation unit 116 performs certain indicated rendering features (e.g., depth testing or pixel blending) on processed pixel data from the plurality of pixel shaders 113_1~113_n.

According to the embodiment of the invention described above, since pixel data generated by a rasterizer is distributed across a plurality of pixel shaders in consideration of not only coordinate values for corresponding pixels, but also certain indicated rendering features, texture cache hits are dramatically increased and overall rendering time is reduced. Consequently, performance of the constituent graphics engine is improved.

The above-disclosed subject matter is to be considered illustrative, and not restrictive, and the appended claims are intended to cover all modifications, enhancements, and additional embodiments which properly fall within the scope of the claims. Thus, to the maximum extent allowed by law, the scope of the invention will be determined by the broadest permissible interpretation of the following claims and their equivalents, and shall not be restricted or limited to only the foregoing illustrated embodiments.

What is claimed is:
1. A 3-dimensional (3D) graphics engine comprising:
a special function register (SFR) configured to provide a control signal indicating a presence or an absence of one or more rendering features;
a geometry processing unit receiving the control signal and configured to generate polygon information in response to the control signal; and
a rasterization unit, comprising:

a rasterizer receiving the polygon information and configured to generate pixel data indicative of the polygon information;

a plurality of pixel shaders; and a pixel distributor receiving the pixel data from the rasterizer and the control signal from the SFR, and configured to distribute the pixel data across the plurality of pixel shaders using a first approach when the control signal indicates the presence of the one or more rendering features and distribute the pixel data across the plurality of pixel shaders using a second approach different from the first approach when the control signal indicates the absence of the one or more rendering features.

2. The graphics engine of claim 1, wherein the one or more rendering features comprises at least one of texture mapping, depth testing, and pixel blending.

3. The graphics engine of claim 2, wherein each one of the plurality of pixel shaders is operatively associated with a texture unit and a texture cache.

4. The graphics engine of claim 3, wherein each texture unit receives pixel data from a corresponding pixel shader, generates corresponding texture data, and stores texture data in a corresponding texture cache.

5. The graphics engine of claim 1, wherein the polygon information defines at least one of block size for a texture cache, a texture format, a texture size, a polygon size, polygon rotation, and a texture filtering mode.

6. The graphics engine of claim 1, wherein a software routine is used to set data values in the SFR, wherein the stored data values indicate the presence or absence of the one or more rendering features and are use to generate the control signal.

7. The graphics engine of claim 6, wherein the software routine is incorporated into a general program running the graphics engine.

8. The graphics engine of claim 1, wherein using the second approach the pixel distributor is further configured to sequentially distribute the pixel data across the plurality of pixel shaders solely on the basis of coordinate data associated with the pixel data, and using the first approach the pixel distributor is further configured to distribute the pixel data across the plurality of pixel shaders on the basis of the coordinate data and data associated with the one or more rendering features.

9. The graphics engine of claim 1, wherein the control signal is directly received by the pixel distributor without passing though the rasterizer.

10. A method of operating a 3-dimensional graphics engine comprising a special function register (SFR), a geometry processing unit, and a rasterization unit, wherein the rasterization unit comprises a rasterizer, pixel distributor and a plurality of pixel shaders, the method comprising:

using the SFR, providing a control signal indicating a presence or an absence of one or more rendering features;

using the geometry processing unit, generating polygon information in response to the control signal;

receiving the polygon information in the rasterizer and generating pixel data indicative of the polygon information;

receiving the pixel data in the pixel distributor; and by operation of the pixel distributor, receiving the pixel data from the rasterizer and the control signal from the SFR, and distributing the pixel data across the plurality of pixel shaders using a first approach when the control signal indicates the presence of the one or more rendering features and distribute the pixel data across the plurality of pixel shaders using a second approach different from the first approach when the control signal indicates the absence of the one or more rendering features.

11. The method of claim 10, wherein the one or more rendering features comprises at least one of texture mapping, depth testing, and pixel blending.

12. The method of claim 11, wherein the method further comprises:

storing data values indicating the presence or absence of the one or more rendering features in the SFR; and generating the control signal in relation to the stored data values.

13. The method of claim 10, wherein the polygon information defines at least one of block size for a texture cache, a texture format, a texture size, a polygon size, polygon rotation, and a texture filtering mode.

14. The method of claim 10, wherein using the second approach the pixel distributor sequentially distributes the pixel data across the plurality of pixel shaders solely on the basis of coordinate data associated with the pixel data, and using the first approach the pixel distributor distributes the pixel data across the plurality of pixel shaders on the basis of the coordinate data and data associated with the one or more rendering features.

15. The method of claim 10, wherein the control signal is directly received by the pixel distributor without passing though the rasterizer.

* * * * *